Dec. 22, 1959  K. F. LIERSE  2,917,874
MACHINE TOOL
Filed Aug. 25, 1958  3 Sheets-Sheet 1
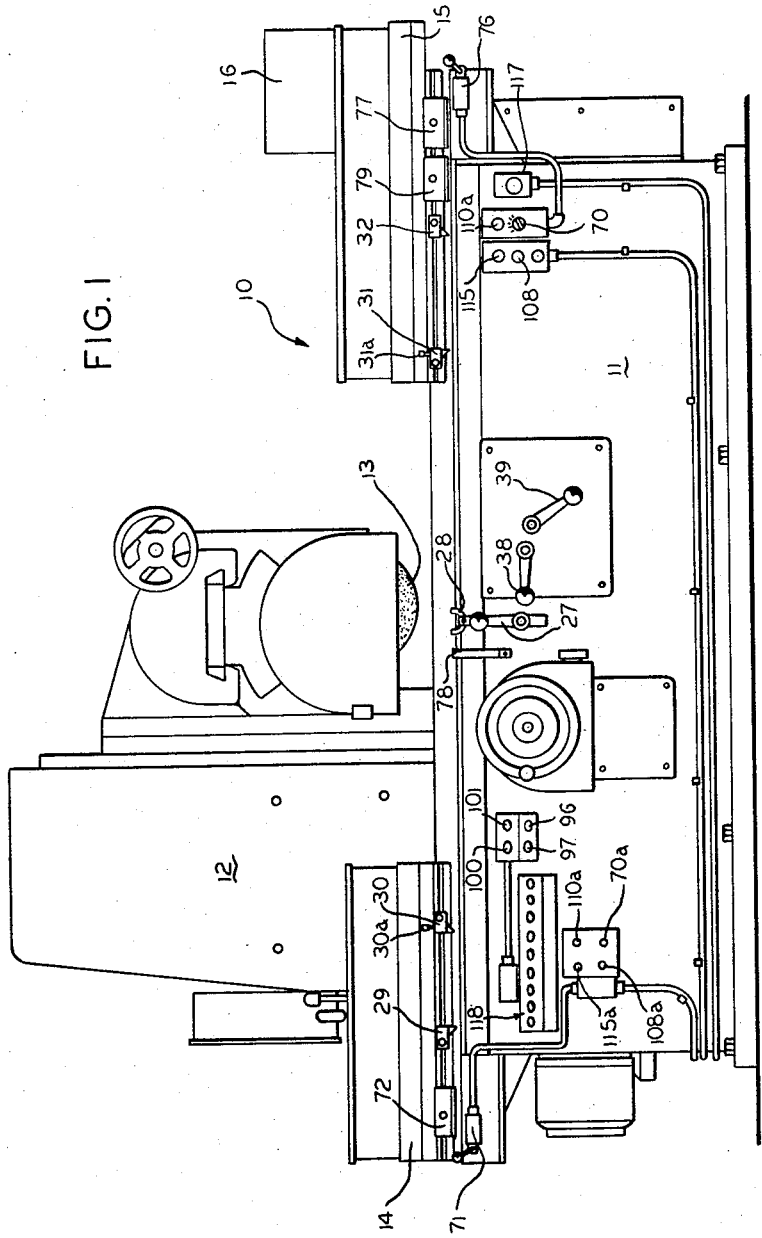
INVENTOR.
KURT F. LIERSE
BY
ATTORNEYS

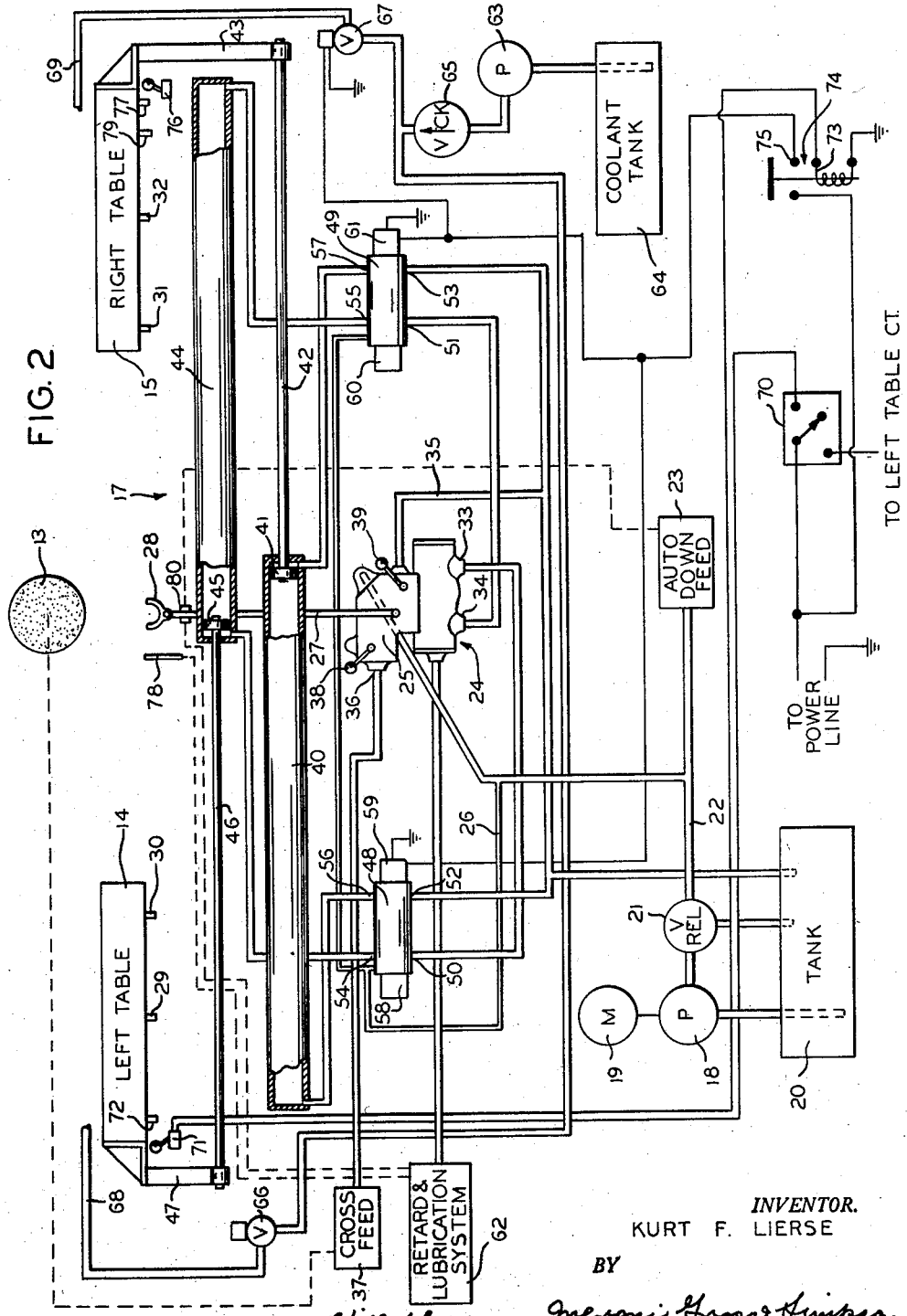

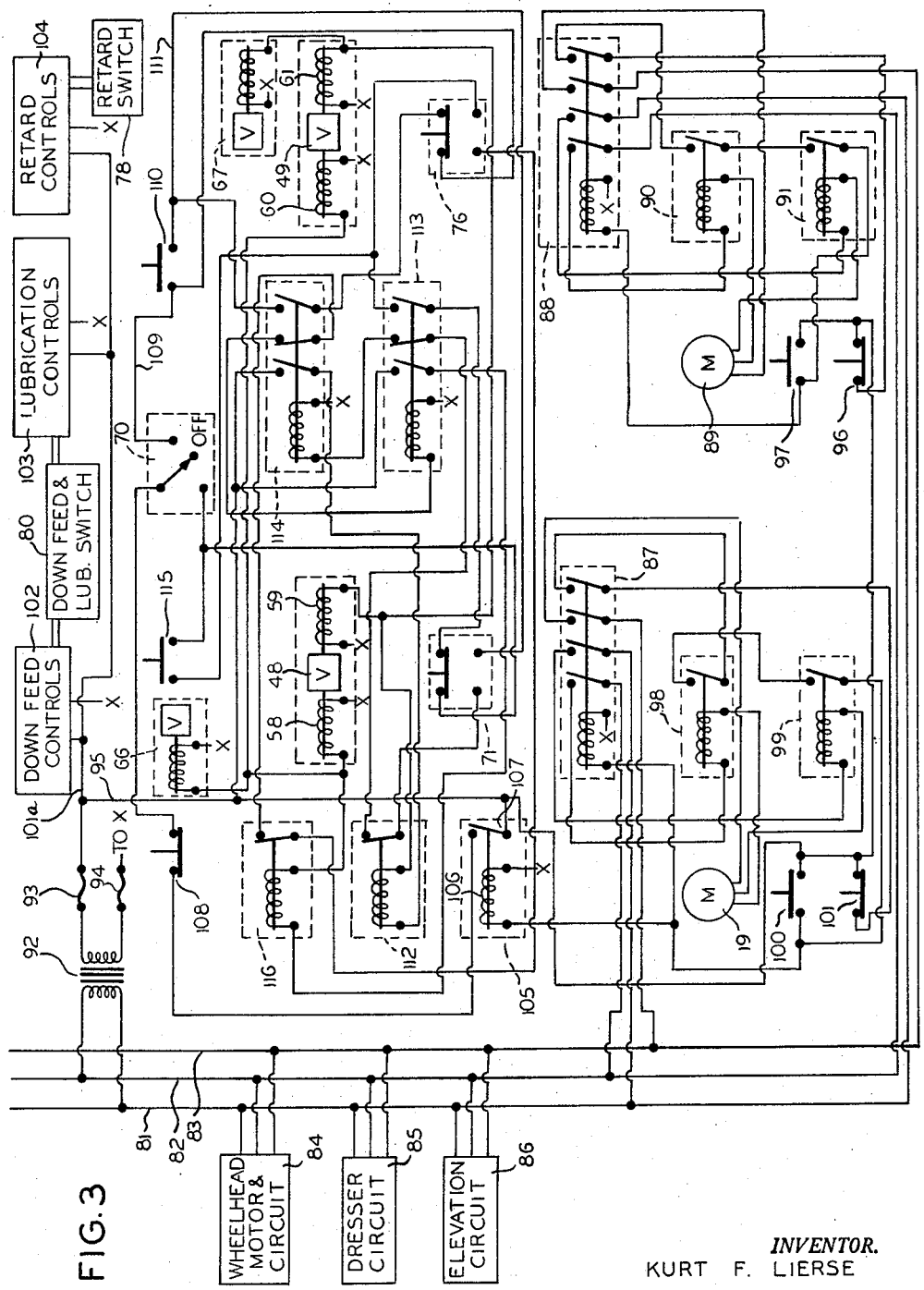

United States Patent Office 2,917,874
Patented Dec. 22, 1959

2,917,874
MACHINE TOOL

Kurt F. Lierse, Harrisburg, Pa., assignor to Thompson Ramo Wooldridge Inc., a corporation of Ohio Application August 25, 1958, Serial No. 757,053

12 Claims. (Cl. 51—92)

This invention relates generally to machine tools, and more specifically to a machine tool, such as a surface grinder, having a pair of workpiece supporting tables incorporated therein.

Although the principles of the present invention may be included in various machine tools, a particularly useful application is made in surface grinders. In particular, when a conventional grinder is used, its table is loaded with production parts, which are then rough-ground to within a few thousandths of the desired dimension. Thereafter the wheel is dressed and the parts are finish ground. They are then unloaded and checked after which the table is reloaded and the foregoing procedure repeated. It is inherent in this type of operation that the machine will be idle during loading, unloading and part checking. It is also apparent that the operator will be idle during rough grinding, wheel dressing, and finish grinding.

The present invention contemplates the utilization of two tables preferably supported on the same ways, only one of which tables may be operated at a given time. With this machine, all unloading, checking and reloading of one table is accomplished while the other table is grinding parts. Thus both the machine and the operator may be kept busy substantially all of the time.

Accordingly, it is an object of the present invention to provide an improved machine tool having a pair of alternatively usable tables incorporated therein.

Another object of the present invention is to provide an improved surface grinder.

Yet another object of the present invention is to provide a machine tool having a hydraulic system capable of independently controlling each of a pair of workpiece supporting tables.

Another object of the present invention is to provide an electric control circuit for a machine tool having a pair of hydraulically operated tables.

Yet another object of this invention is the provision of controls for a machine tool having a pair of workpiece supporting tables.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

Figure 1 is a front elevational view of a surface grinder equipped with a pair of workpiece supporting tables provided in accordance with the principles of the present invention;

Figure 2 is a diagram of the hydraulic system used in the machine tool shown in Figure 1 to effect proper reciprocation of each of the tables; and Figure 3 is a diagram of the electrical circuit employed to control the hydraulic system shown in Figure 2.

As shown on the drawings:

The principles of this invention are particularly useful when embodied in a surface grinder such as illustrated in Figure 1, generally indicated by the numeral 10. While the instant invention has been disclosed in connection with a grinder, it is to be understood that machine tools employing various types of shaping or cutting tools may be provided with my invention. The machine tool or surface grinder 10 includes a base 11, a tool supporting assembly or member 12, which in this example is provided with a grinding wheel 13, and a pair of tables for supporting workpieces including a left table 14 and a right table 15. Each of the tables 14 and 15 is reciprocably supported by the base adjacent to the tool supporting member 12 whereby the grinding wheel 13 may engage workpieces supported on the tables 14 and 15. In this example, the right hand table 15 has been made slightly longer than the left hand table so as to enable it to support a wheel dresser mechanism generally indicated by the numeral 16.

A reversible driving means is provided for each of the tables 14, 15 whereby either table may be reciprocated only when the other table is in a fully retracted position. The reciprocation takes place automatically, and the operator is provided with controls whereby he may select which of the tables 14, 15 is to be reciprocated. To this end, there is provided a fluid system, such as a hydraulic system, for driving the tables, together with an electrical system for controlling the fluid system. The operator's control stations form a part of the electrical system which operates to position a plurality of valves jointly so that only the selected table can be reciprocated.

Referring now to Figure 2, there is shown the details of the hydraulic system generally indicated at 17, and provided with a rudimentary group of electrical controls for operating one of the tables.

The fluid driving system 17 includes a source of pressurized fluid here comprising a hydraulic pump 18 driven by an electric motor 19 which draws hydraulic fluid from a reservoir or tank 20.

The pump 18 discharges through a hydraulic relief valve 21 to a line 22 which supplies fluid to an automatic down feed system 23 for the grinding wheel 13, which system is of conventional construction, and also to a fluid control means here comprising a master valve 24. The master valve 24 is of conventional construction and includes a main spool (not shown) which is under the control of a pilot valve 25 which receives hydraulic fluid from a line 26 to position the main spool. The position of the pilot valve 25 is governed by a table reverse lever 27 which is pivotally supported by the master valve 24 and which has an upper end 28 adapted to engage a plurality of dogs 29—32 on the tables 14 and 15. When the table reverse lever 27 is in one position, the port 33 discharges hydraulic fluid under pressure while the port 34 is simultaneously in communication with the return line 35 leading to the tank 20. When the table reverse lever 27 is in the opposite position, the port 34 is supplied with hydraulic fluid under pressure while the port 33 communicates with the hydraulic return line 35.

The master valve 24 is also provided with a discharge port 36 which communicates with a hydraulically operated cross feed 37 which is mechanically connected to the grinding wheel 13. The details of the cross feed 37 are known in the art and do not form a part of the instant invention. The master valve 24 is provided with a lever 38 by which the cross feed 37 may be turned on or off.

While the lever 27 is used to effect automatic reversal or reciprocation of a selected table, a further lever 39 is provided, the position of which is effective to start or stop table reciprocation. When, for example, the right hand table 15 is disposed adjacent to the grinding wheel 13, the upper end 28 of the lever 27 is disposed between the dogs 31 and 32. When the lever 27 is positioned toward the right, the dog 32 strikes the upper end thereof 28 causing the lever 27 to move to the left. This in turn effects a pressure reversal at the ports 33 and 34 whereby the table 15 is caused to move to the right until the dog 31 strikes and moves the upper end 28 of the lever 27 toward the right which again effects table movement in the opposite direction. Thus the master valve 24 comprises means which is responsive to the table movement in either direction and which is operative to automatically effect periodic reversal of the table movements.

A fluid motor or actuator 40 is provided with a piston rod 41 to which there is connected a piston rod 42 which has a driving connection as at 43 with the right table 15. A second fluid actuator or motor 44 has a piston 45 to which is connected a piston rod 46 which has a driving connection as at 47 with the left hand table 14.

Operatively intermediate the master valve 24 and the fluid motors 40 and 44, there is provided a first electric selector valve 48 and a second electric selector valve 49. It will be noted that each of the valves 48 and 49 in this embodiment are individually intermediate the master valve or control means 24 and both of the motors 40 and 44. Thus the port 33 of the master valve 24 communicates with a pressure port 50 on the selector valve 48, while the pressure port 34 communicates with a pressure port 51 on the selector valve 49. The valves 48 and 49 are each respectively provided with a return port 52 and 53 which communicates with the tank 20. The valve 48 is provided with a port 54 which communicates with the rod or left end of the motor 44 and a port 56 which communicates with the left or head end of the motor 40. Similarly, the valve 49 is provided with a port 55 which communicates with the right or head end of the motor 44, and a port 57 which communicates with the right or rod end of the motor 40. The valves 48, 49 are each electrically actuated and hydraulically operated, and comprise conventional construction. To this end, the pilot pressure line 26 also communicates with each of the valves 48, 49, and solenoids 58—61 are provided for actuating the pilot valve portions thereof respectively.

Typical valves employed may also include drain ports by which internal leakage is conducted to the tank 20. For purposes of clarity, all drain ports and drain lines of this type have been omitted from the drawing, the provision of them for components requiring the same being conventional.

The master valve 24 is also provided with an additional port which communicates with a combined retard and lubrication system 62 of a type known in the art.

The surface grinder 10 disclosed herein has also been provided with a coolant pump 63 which draws coolant from a tank 64, sending it through a check valve 65 to a pair of solenoid valves 66, 67, each of which is respectively provided with a line 68, 69 communicating with the table 14 and the table 15. Suitable means are provided for returning the used coolant to the tank 64, but are not shown in the drawing. When the valves 66 and 67 are de-energized, no coolant can flow therethrough.

Figure 2 also includes a simplified wiring diagram by which the right hand table 15 may be operated. A source of power is connected to a manually operable selector switch 70 which is shown to have three positions, one for selecting operation of the left hand table 14, a middle "off" position and a third position where the circuit for the right hand table is energized. The circuit extends from the selector switch 70 to a limit switch 71 which is normally open. However, when the left hand table 14 is in a fully retracted position, a stop plate 72 engages the switch 71 to hold it electrically closed. The circuit extends from the switch 71 to a coil 73 of a relay generally indicated at 74. The relay 74 includes a pair of normally open contacts 75, one of which is connected to the source of power and the other of which is connected to the valve solenoids 59, 61, and the solenoid of the coolant valve 67. When the relay 74 is thus energized, the closing of the contacts 75 provides power to the above indicated solenoids.

When the solenoids 59 and 61 are energized, the left hand end of the motor 44 and the port 54 of the valve 48 are in communication with the return line 52, while the right hand end of the motor 44 and the port 55 are in communication with the return line 53. Simultaneously, the port 50 of the valve 48 is in communication with the port 56 and the left hand end of the motor 40 while the port 51 of the valve 49 is in communication with the port 57 thereof and the right end of the motor 40. With the circuit for the right table 15 thus energized, the lever 27 may be manually positioned toward the right to cause the right table to move toward the left. Moving the lever 27 to the right permits fluid under pressure to discharge through the port 34 of the master valve 24 through the port 51 and the port 57 of the valve 49 and into the rod end of the motor 40, thereby causing movement to the left. Fluid on the left side of the piston 41 leaves through the left end of the motor 40 and enters the port 56 of the valve 49 and is discharged through the port 50 to enter the master valve 24 at the port 33 and to be discharged therefrom through the return line 35 to the tank 20. When the table reverse lever 27 is engaged by the dog 32 it moves to the left to reverse the pressure at the ports 33 and 34 of the master valve 24 thereby causing fluid to flow through the same circuit and the same ports in the opposite direction, and likewise discharging through the line 35 to the tank 20.

It is to be noted that the solenoid valve 67 is connected electrically across the solenoids 59 and 61, or in parallel therewith, whereby the solenoid 67 is energized only when the right hand table is to be reciprocated. Thus an interruption of the control circuit for the right hand table also interrupts the flow of coolant thereto.

The control circuit for the left hand table, although not shown in the drawing, is similar to the right hand table circuit, and extends through a limit switch 76 which is engageable by a stop plate 77 carried by the right table 15. The valve solenoids 58 and 60 together with the solenoid valve 66 are similarly simultaneously energized to effect operation of the left table 14. Because of the structure of the selector switch 70, the left table can be energized only when the right table controls are de-energized, and when the right table is in a retracted position whereby the limit switch 76 is held in a closed position.

When the controls are energized to operate the left table, the left end of the right motor 40 communicates through the port 56 and the port 52 of the valve 48 with the tank 20, while the right end of the right motor 46 communicates through the ports 57 and 55 with the tank 20. The left or rod end of the motor 44 communicates through the port 54 with the port 50 of the valve 48 and the port 33 of the master valve 24, while the right end of the left motor communicates with the port 55 and the port 51 of the valve 49 and the pressure port 34 of the master valve 24. To move the left table to the right, the table reversing lever 27 is moved to the left, thereby discharging pressure at the port 33 which passes through the ports 50 and 54 of the valve 48 to the left end of the motor 44. Fluid in the motor 44 to the right of the piston 45 is returned through the ports 55 and the port 51 of the valve 49 to the port 35 and thence through the return line 35 to the tank 20.

This movement continues until the dog 29 engages the upper end 28 of the table reverse lever 27, moving it to the right, which effects a reversal of pressure at the outlets 33 and 34 of the master valve 24. Thus pressure is discharged at the port 34 and passes through the ports 51 and 55 of the valve 49 to the right end of the motor 44 to cause the table 14 to move to the left. Fluid to the left of the piston 45 is returned through the ports 54 and 50 of the valve 48 to the port 33 and thence through the return line 35 to the tank 20. This movement continues until the dog 30 engages the upper end 28 of the lever 27 to effect a reversal in direction of table movement. Likewise, the coolant valve 66 may be energized only when the left hand table is being operated since it is connected in parallel with the solenoids 58 and 60. Thus also should either of the retracted tables be moved away from the retracted position, the circuit to the other table is instantly interrupted whereby reciprocation would immediately terminate. Moreover, reciprocation cannot initiate unless the opposite table is fully retracted.

The check valve 65 on the discharge side of the coolant pump 63 prevents a draining of the coolant lines whenever the pump 63 is stopped.

Adjacent to the upper end 28 of the table reverse lever 27 there is provided a retard switch 78 which is engageable by the stop plate 72 in the event that the dog 29 should overrun the upper end of the lever 28. The switch 78 communicates with the retard and lubrication system to effect diversion of the reciprocation-effecting fluid at a high rate of flow.

Thus the switch 78 may be energized by the combined stop and overrun plate 72 to prevent the left table 14 from striking the right table 15. The right table 15 has been provided with a separate overrun plate 79 for also engaging the retard switch 78 in the event that the dog 32 overruns the upper end 28 of the lever 27. This plate thus prevents the right hand table 15 from striking the left table 14.

Referring now to Figure 1, the combined overrun and stop plate 72 is shown as being secured to the left table 14 in an adjustable manner. The dogs 29—32 are likewise also secured to one of the tables 14 and 15. The stop plate 77 and the overrun plate 79 are shown to comprise separate plates whereby the relative point at which the overrun plate 79 engages the retard switch 78 may be adjusted without affecting the point at which the stop plate 77 engages the limit switch 76. It is to be understood that the overrun and stop plate functions may be combined as shown for the left hand table or may be separated as shown for the right hand table.

The dogs 30 and 31 are not only secured to the tables 14 and 15, but are loosely pivotally mounted thereon so that each may pivot out of the way past the upper end 28 of the lever 27, as the respective tables are being moved to an operative position with respect to the grinding wheel 13. If desired, a small handle may be provided as at 30a and 31a for manually pivoting the dogs 30 and 31 respectively.

As best seen in Figure 2, a double purpose downfeed and lubrication switch 80 is provided adjacent to the upper end of the table reverse lever 27. (This switch is obscured by the lever itself in Figure 1.) The switch 80 communicates electrically with the automatic downfeed system 23 and with the lubrication system 62 for automatically providing an increment of downfeed of the wheel 13 and lubrication of the table supports for each stroke of each table, and in synchronism therewith. Thus the downfeeding and lubrication both terminate when reciprocation of either table is terminated.

Referring now to Figure 3, there is shown a complete control circuit for both of the tables 14 and 15. It is to be understood that this figure represents a preferred circuit for the control of the hydraulic tables, and that less refined circuits such as shown in Figure 2 may also be employed to advantage.

A three phase power supply including lines 81, 82 and 83 communicates with the motor for the grinding wheel, and its control circuit, generally indicated at 84. The power supply also communicates with the dresser and its control circuit generally indicated at 85. The power supply further communicates with the elevation controls and circuits generally indicated at 86. Still further, the lines 81—83 communicate with each of a hydraulic pump relay 87 and a coolant pump relay 88. A coolant pump motor 89 connected to the coolant pump 63 of Figure 2, is shown to comprise a three phase motor connected to the opposite contacts as are the lines 81—83 so that when the relay 88 is closed, the motor is energized. Intermediate the coolant pump relay 88 and the coolant pump 89, there is provided a pair of safety relays 90 and 91, the coils of which are each connected in series with one of the lines leading to the coolant pump motor 89. The controls for the coolant pump motor 89 are energized from a step down transformer 92 which has a primary connected across the lines 81 and 82. Each of the legs of the secondary thereof passes through a fuse 93 and 94 respectively. The fuse 93 is connected to various controls, while the return lines therefrom have all been omitted to simplify the drawing, the return line being indicated by the various points denoted as "x" which are connected to the fuse 94. Thus the fuse 93 has a downwardly extending control power line 95 which communicates with the stop switch 96 and the start switch 97 for the coolant pump motor 89. The opposite contact of the start switch 97, which is a normally open momentary switch, is connected to the coil of coolant pump relay 88. Thus when the start switch is depressed, a circuit is closed to the coil of the relay 88 which causes the contacts thereof to close. Three of the pairs of contacts bring power to the coolant pump motor as described and thereby also energize the coils of the safety relays 90 and 91. Thus with the relay 88 closed, the relays 90 and 91 closed, there is provided an alternate circuit to the coil of the relay 88 which circuit extends from the line 95 through the normally closed momentary stop switch 96, thence through the fourth set of contacts of the relay 88, thence through the contacts of the relays 90 and 91 to the opposite contact of the start switch 97. Thus the coolant pump motor 89 is started by a momentary actuation of the switch 97 which closes the relay 88, and which is held closed by an auxiliary holding circuit extending through the stop switch 96, by the momentary actuation of which the relay 88 and the pump motor 89 may be de-energized. In the event that current in one of two phases should fail, one of the relays 90 and 91 will open to stop the pump motor 89. The details of the circuit used to operate the coolant pump motor 89 are known in the art and do not form a part of this invention.

The hydraulic pump motor 19 is provided with a substantially identical set of controls which includes the hydraulic pump relay 87, a pair of safety relays 98, 99, a normally open momentary start switch 100, and a normally closed momentary stop switch 101. Power for the motor 19 is brought from the lines 81—83 to the relay 87, which, upon closing, brings the power to the hydraulic pump motor 19, two of the lines including the coils of the relays 98 and 99 in series. Control power is brought from the line 95 to each of the start and stop switches 100 and 101 respectively, whereby closing of the switch 100 momentarily closes the relay 87 to not only bring power to the motor 19, but to close the holding circuit for the current passing through the coil of the relay 87. As in the case of the coolant pump circuit, the portion of the circuit for the hydraulic pump motor thus described is also known in the art.

A second control power line 101a communicates with the fuse 93 to bring control power to each of the downfeed controls 102, the lubrication controls 103, and the retard controls 104, each of which controls are provided with sub-circuits known in the art. The dual purpose downfeed and lubrication switch 80 communicates with each of the downfeed controls 102 and the lubrication controls 103, while the retard switch 78 communicates with the retard controls 104.

The remainder of the drawing is the principal part thereof and shows the combined electric control circuit which has branches provided for each of the tables 14 and 15. First there is a relay 105 which has a coil 106 that is connected across or in parallel with the coil of the hydraulic pump relay 87, and is thereby under the control of the start switch 100 and the stop switch 101 for the hydraulic pump motor. Thus the coil 106 of the relay 105 operates in coordination with the hydraulic pump motor 19. The control power line 95 is connected to the contacts 107 of the relay 105 through which all electric power for the electric control circuit for the reciprocating tables is provided. The power circuit thus extends from the fuse 93 through the line 95, and the contacts 107, to a normally closed momentary stop switch 108 which in turn is connected to the selector switch 70. The selector switch 70 is settable to separate positions, and may be set so manually. One position provides power to the branch of the control circuit directed to the right table, an opposite position provides power to the branch of the control circuit directed to the left table 14, and an intermediate position provides no power to either of these branches. Thus the control circuit is alternatively settable for selecting only that one of the branches of the circuit which is to control the operation of the selected workpiece supporting table 14 or 15.

The branch for the right table begins with a lead 109 which is connected to a group of electric controls including a normally open momentary start switch 110 thence through the line 111 through a pair of normally open contacts in the left table limit switch, thence through the contacts of an overload relay 112, thence through a pair of normally closed contacts in the left table relay 113, and thence to the coil of a relay 114 for the right table. It will be noted that this circuit can be completed only when the left table is in a fully retracted position so that the normally open contacts of the left limit switch 71 are closed, and if the control relay 113 for the left table is de-energized. Thus, even though the right table 15 may have been in its fully retracted position, the limit switch 76 does not preclude the starting of the reciprocation thereof. Once the table begins to move, the right limit switch 76 moves to its normal position as shown by the drawing. The establishment of current through the right relay 114, also closes a holding circuit which extends from one contact of the start switch 110, through the now closed or upper contacts in the right limit switch 76, thence through a pair of holding contacts in the right relay 114 which are now closed, and thence to the opposite contacts of the right starting switch 110 whereby current continues to flow through the line 111 subject to the left table holding the appropriate contacts of the left limit switch 71 closed.

The control power line 95 also brings power to a contact in each of the right relay 114 and the left relay 113. When the right relay 114 closes, current passes through such contacts, which are shown immediately adjacent to the coil, and thence through the coil of the overload limiting relay 112 to the right hand solenoid 59 of the valve 48, to the right hand solenoid 61 of the valve 49, and to the solenoid of the coolant valve 67. Therefore, if the left relay 113 is energized or is stuck in an energized position, the contacts thereof which are in series with the coil to the right relay 114 would be open and would prevent energizing of the right table controls.

When the selector switch is moved to its opposite position, power is brought from the fuse 93 through the line 95, the contacts 107 and the stop switch 108 to a line which leads to the left start switch 115. When the left table start switch 115 is closed, current passes therethrough and to the normally open contacts of the right limit switch 76 which are held in closed position by the retracted position of the right table 15. From the switch the circuit branch extends through the contacts of an overload relay 116 and thence through a pair of contacts in the right relay 114 which are closed if the relay 114 is de-energized. The circuit then extends to the coil of the left relay 113. Thus the closing of the left start switch 115 energizes the coil of the left relay 113 provided that the right relay 114 is de-energized and provided that the right table 15 is in its fully retracted position. The closing of the left relay 113 also closes a holding circuit which extends about the contacts of the left start switch 115, beginning at a point intermediate the switch 115 and the selector switch 70, extending through the normally closed contacts of the left limit switch 71, which are closed whenever the left table is not in its retracted position, and thence extending through the holding contacts of the left relay 113 for communication with the opposite contacts of the left momentary start switch 115. Closing of the relay 113 also closes a circuit including the contacts shown to be adjacent to the coil of the left relay which circuit extends through the coil of the overload limiting relay 116 and thence to each of the solenoid 58 of the valve 48, the solenoid 60 of the valve 49, and the solenoid coolant valve 66.

In the event that current to one of the groups of valves is excessive, such current will cause one of the overload limiting relays 112 and 116 to open. Accordingly, such relays preferably are of the manual reset type.

It can be seen that since the normally closed momentary stop switch 108 is in a position ahead of the selector switch 70, a single stop switch through which the control current passes will serve, upon opening thereof, to interrupt the current through the coil of the left relay 113 as well as through the coil of the right relay 114, thereby opening the corresponding holding circuits for such relay.

Thus it can be seen that an electric control circuit has been provided for each table, which is alternatively selectable and which includes a plurality of valve solenoids, which circuit is in series with a limit switch at the opposite table and in electrical series with the valves to be controlled, whereby each table must be laterally retracted to close the limit switch for the operation of an opposite table. It is further seen that selector means has been provided by which only one motor may be run, which selector means collectively includes a manual selector switch together with a plurality of electric valves which are disposed between the control means or master valve 24 and the motors 40 and 44. The manual selector switch 70, and each of the relays 113 and 114, as well as each of the limit switches 71 and 76 permit only the circuit for one table to be energized at a time. It is further seen that neither circuit can be energized in this embodiment unless the hydraulic pump motor 19 is also being energized. It is also seen that each of the overload relays 112 and 116 is disposed in one branch of the circuit respectively, and is responsive to the electric current through the valves in such branch whereby it may move to open the circuit in the event that the current through one of the valves increases to a predetermined level. It is also apparent that each of the relays 113 and 114 is provided with a coil that has associated with it a pair of holding contacts for keeping such coil energized, a pair of normally open contacts which when closed provides power to the various valves jointly to be energized for the reciprocation of one table, and also includes a set of normally closed contacts which are connected in the circuit for the opposite table which contacts open whenever the coil of the relay is energized to prevent starting of the opposite circuit. Further, each of the limit switches 71 and 76 is also responsive to table retraction to break the corresponding holding circuits.

Referring again to Figure 1, it will be noted that there are a series of controls disposed adjacent to the right table 15. These include the right start switch 110, the left start switch 115, the stop switch 108, and the selector switch 70. If desired, an emergency master switch 117 which controls the power to the lines 81—83 may also be included. At the left of the machine adjacent to the table 14, in a preferred embodiment, a duplicate control station may be provided which includes a second start switch 110a connected in parallel to the start switch 110, a second left start switch 115a connected in parallel to the left start switch 115, a second stop switch 108a connected in series with the stop switch 108 and a second selector switch 70a connected in parallel or series parallel with the selector switch 70. Because of the novel arrangement employed in the control circuit, the operator can still operate only one of the tables at a time.

Also located to the left of the machine tool 10 are the hydraulic pump motor start switch 100 and the hydraulic pump motor stop switch 101. Adjacent thereto are the coolant pump motor start switch 97 and the coolant pump motor stop switch 96. Of course, these could also be duplicated as already described, if desired, at the opposite end of the machine. Also located at the left end of the machine tool 10 is a collection of controls generally indicated by the numeral 118 which are used to control the various other controls such as those pertaining to the wheel head motor, the wheel dresser, and the elevation circuit.

To operate the machine, the hydraulic pump is first started by pushing the start switch 100, after which the wheel motor is started and then properly positioned by use of the control buttons 118. Next the coolant pump is started by pushing the start switch 97. The selector switch 70 is then set for one table, such as the left hand table. Then the left table start button 115 is pushed providing that the right hand table 15 is at rest in a manner which holds the limit switch 76 in an actuated position. This energizes the solenoids 58, 60, and solenoid valve 66. The lever 39 is then engaged, thereby causing the left hand table to reciprocate.

To operate the right table 15, the selector switch 70 is moved to its opposite position and the right hand start switch 110 is depressed, after which the lever 39 may again be engaged. In case of mechanical failure to either table during reciprocation thereof, the limit switches 71 and 76 will not permit energizing of the other table, and thereby stop all hydraulic pressure arriving at either table.

This invention also provides a novel method of operating a machine tool which employs two relatively reciprocable workpiece supporting tables. First, the one workpiece supporting table is relatively reciprocated with respect to the tool supporting means, while the other workpiece supporting table is simultaneously readied for future relative reciprocation. This includes such steps as unloading, loading, checking, and the like. Thereafter, the other workpiece supporting table is relatively reciprocated with respect to the tool supporting means and the previously reciprocated workpiece supporting table is simultaneously readied for further relative reciprocation. It can be seen that this method of operating a machine tool has a distinct advantage in that both the machine and the operator are kept busy substantially all of the time.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a machine tool: a tool supporting member; a pair of tables each adapted to support at least one workpiece, and reciprocably disposed adjacent to said member; a pair of motors each operatively connected to one of said tables for reciprocating the same; control means adapted to automatically effect periodically reversing operation of said motors; and selector means operatively disposed intermediate said control means and said pair of motors by which only one of said pair of motors may be operated at a single time.

2. In a machine tool: a tool supporting member; a pair of tables each adapted to support at least one workpiece, and reciprocably disposed adjacent to said member; a pair of fluid motors each operatively connected to one of said tables for reciprocating the same; fluid control means adapted to effect operation of said motors, said means being responsive to movement of said tables in either direction to effect operation of said motors in the opposite direction; and manually controllable selector valve means operatively disposed intermediate said fluid control means and said pair of fluid motors by which only one of said pair of fluid motors may be operated at a single time.

3. In a machine tool: a tool supporting member; a pair of tables each adapted to support at least one workpiece, and reciprocably disposed adjacent to said member; a hydraulic system for reciprocating said tables, said system including a pump, an electric motor for driving said pump, and a plurality of electric valves communicating with said pump for controlling said system; and an electric relay having a coil connected to be operatively coordinated with said electric motor, and having contacts connected for supplying current to said electric valves only when said coil is energized.

4. In a machine tool: a tool supporting member; a pair of tables each adapted to support at least one workpiece, and reciprocably disposed adjacent to said member; a pair of fluid motors each operatively connected to one of said tables for reciprocating the same; fluid control means adapted to effect operation of said motors, said means being responsive to movement of said tables in either direction to effect operation of said motors in the opposite direction; an electro-fluid control circuit for each of said tables, each of said circuits including a limit switch disposed adjacent to the opposite table, at least one electric valve connected in electric series with said limit switch and operatively intermediate said fluid control means and at least one of said fluid motors; and a selector switch operative to energize only one of said circuits at a time; each of said limit switches being operative to permit operation of its circuit only when said opposite table is laterally retracted from said tool supporting member.

5. In a machine tool: a tool supporting member; a pair of tables each adapted to support at least one workpiece, and reciprocably disposed adjacent to said member; a pair of motors each operatively connected to one of said tables for reciprocating the same; control means adapted to automatically effect periodically reversing operation of said motors; an electric control circuit for each of said tables, each of said circuits including a limit switch disposed adjacent to the opposite table; and a selector switch operative to energize only one of said circuits at a time; each of said limit switches being operative to permit operation of its circuit only when said opposite table is laterally retracted from said tool supporting member.

6. In a machine tool: a tool supporting member; a pair of tables each adapted to support at least one workpiece, and reciprocably disposed adjacent to said member; a pair of motors each operatively connected to one of said tables for reciprocating the same; control means adapted to automatically effect periodically reversing operation of said motors; an electric control circuit for each of said tables; a selector switch operative to energize only one of said circuits at a time; and means in each of said control circuits responsive to the position of the opposite table to permit operation of its circuit only when said opposite table is laterally retracted from said tool supporting member.

7. In a machine tool: a tool supporting member; a pair of tables each adapted to support at least one workpiece, and reciprocably disposed adjacent to said member; a pair of fluid motors each operatively connected to one of said tables for reciprocating the same; fluid control means adapted to effect operation of said motors, said means being responsive to movement of said tables in either direction to effect operation of said motors in the opposite direction; a first selector valve operatively disposed intermediate said fluid control means and both of said motors for passing fluid to drive only a selected one of said motors in a first direction; a second selector valve operatively disposed intermediate said fluid control means and both of said motors for passing fluid to drive only said selected motor in an opposite direction; and means for jointly positioning said valves so that only said selected motor can be operated.

8. In a machine tool: a tool supporting member; a pair of tables each adapted to support at least one workpiece, and reciprocably disposed adjacent to said member; a pair of fluid motors each operatively connected to one of said tables for reciprocating the same; fluid control means adapted to effect operation of said motors, said means being responsive to movement of said tables in either direction to effect operation of said motors in the opposite direction; a first selector valve operatively disposed intermediate said fluid control means and both of said motors for passing fluid to drive only a selected one of said motors in a first direction; a second selector valve operatively disposed intermediate said fluid control means and both of said motors for passing fluid to drive only said selected motor in an opposite direction; a pair of coolant valves adapted to be connected to a source of coolant and to discharge coolant at each of said tables respectively; and means for jointly positioning said valves so that only said selected motor can be operated and so that coolant may be discharged only at said table connected thereto.

9. In a machine tool: a base; a tool supporting member carried by said base; a pair of reciprocable tables disposed adjacent to said member; driving means adapted to move one of said tables only when the other table is in a retracted position, and responsive to said table movement in either direction to effect driving of said one table in the opposite direction; and a pair of substantially identical control stations supported by said base at each of the retracted table positions, respectively, by each of which the control of either table may be effected.

10. In a machine tool: a tool supporting member; a pair of tables each adapted to support at least one workpiece, and reciprocably disposed ajacent to said member; a fluid system for reciprocating said tables, said system including a plurality of electric valves for the control thereof; an alternatively selectable electric control circuit for each of said tables and including said electric valves, said circuits each being adapted to position said valves jointly so that only one of said tables may be operated respectively; and means in each of said circuits responsive to the electric current through said valves, and operative to open said circuit upon the increase of said current to a predetermined level.

11. In a machine tool: a tool supporting member; a pair of tables each adapted to support at least one workpiece, and reciprocably disposed adjacent to said member; a fluid system for reciprocating said tables, said system including a plurality of electric valves for the control thereof; an alternatively selectable control circuit for each of said tables and including said electric valves, said circuits each including a relay having a coil connected therein and a pair of normally closed contacts connected in the opposite circuit and movable to an open position when said coil is energized, said relay having a pair of normally open contacts connected to energize said valves jointly so that only the corresponding table may be operated.

12. In a machine tool: a tool supporting member; a pair of tables each adapted to support at least one workpiece, and reciprocably disposed adjacent to said member; a fluid system for reciprocating said tables, said system including a plurality of electric valves for the control thereof; a selector switch settable to separate positions for effecting individual reciprocation of each of said tables; and a group of electrical controls connected to each of said positions, each group including in series a normally open momentary start switch, a normally open limit switch disposed to be closed by retraction of the opposite table, a relay having a coil connected therein, and a pair of normally closed relay contacts from the relay of the other group of controls, together with a normally closed limit switch disposed to be opened by retraction of the corresponding table connected in series with a pair of normally open contacts of said relay and jointly connected across said start switch as a holding circuit for said relay coil, said relay having a pair of normally open contacts connected to energize said valves jointly so that only the corresponding table may be operated.

References Cited in the file of this patent
UNITED STATES PATENTS

| | | |
|---|---|---|
| 310,861 | Hyde et al. | Jan. 13, 1885 |
| 2,837,975 | Johnson | June 10, 1958 |